United States Patent [19]
Hou

[11] Patent Number: 5,437,425
[45] Date of Patent: Aug. 1, 1995

[54] FOLDING STAND FOR AN OFFICE CHAIR

[76] Inventor: Chun H. Hou, No. 10, Lane 228, Yen Ho Street, Yung Kang Hsiang, Tainan Hsien, Taiwan

[21] Appl. No.: 194,849

[22] Filed: Feb. 14, 1994

[51] Int. Cl.⁶ ............................................. F16M 11/38
[52] U.S. Cl. ................................ 248/188.6; 248/166; 248/188; 403/91
[58] Field of Search ............... 248/188.6, 188.7, 188.8, 248/188, 165, 166; 403/91, 84, 100, 101, 102

[56] References Cited

U.S. PATENT DOCUMENTS

| | | | |
|---|---|---|---|
| 2,653,000 | 9/1953 | Cadwell et al. | 248/188.7 |
| 3,417,952 | 12/1968 | Bieschke | 248/188.6 |
| 3,479,973 | 11/1969 | Bartlett et al. | 248/188.7 |
| 4,010,922 | 3/1977 | Heller et al. | 248/165 |
| 4,036,462 | 7/1977 | Sheftel | 248/188.6 X |
| 4,053,129 | 10/1977 | Graff | 248/188.7 |

Primary Examiner—Alvin C. Chin-Shue
Assistant Examiner—Korie H. Chan
Attorney, Agent, or Firm—Jones, Tullar & Cooper

[57] ABSTRACT

A folding stand for an office chair stand includes an annular frame to hold the upright shaft of an office chair, a plurality of radial lugs horizontally spaced around the annular frame, and a plurality of legs respectively hinged to the radial lugs and supported on a respective wheel assembly and turned between a working position in line with the respective lug and a collapsed position perpendicular to the respective lug, and retainer springs respectively retained in either leg to lock the respective leg in the working position or the collapsed position.

2 Claims, 4 Drawing Sheets

FOLDING STAND FOR AN OFFICE CHAIR

BACKGROUND OF THE INVENTION

The present invention relates to stands for office chairs, and relates more particularly to a folding stand for an office chair which can be folded up to minimize its storage space.

The stand of an office chair as referenced by 10 in FIG. 1, is generally comprised of a plurality of radial legs 101 supported on a respective wheel assembly. Because the stand 10 is not collapsible, it needs much storage space, and therefore its transportation cost is high. Further, when wheeled leg 101 is damaged, the whole stand 10 becomes useless and should be wholly replaced.

SUMMARY OF THE INVENTION

The present invention has been accomplished under the aforesaid circumstances. It is therefore the principal object of the present invention to provide a folding stand for an office chair which can be folded up to reduce its storage space or package size. It is another object of the present invention to provide a folding stand for an office chair which allows either leg thereof to be separately repaired or replaced.

According to the preferred embodiment of the present invention, the legs are respectively hinged to a respective lug on an annular frame, which receives the upright shaft of the office chair, and a retainer spring is fastened inside either leg to lock the respective leg in the working position in line with the respective lug or the collapsed position perpendicular to the respective lug.

DETAILED DESCRIPTION OF THE PREFERRED EMBODIMENT

Figure 1:
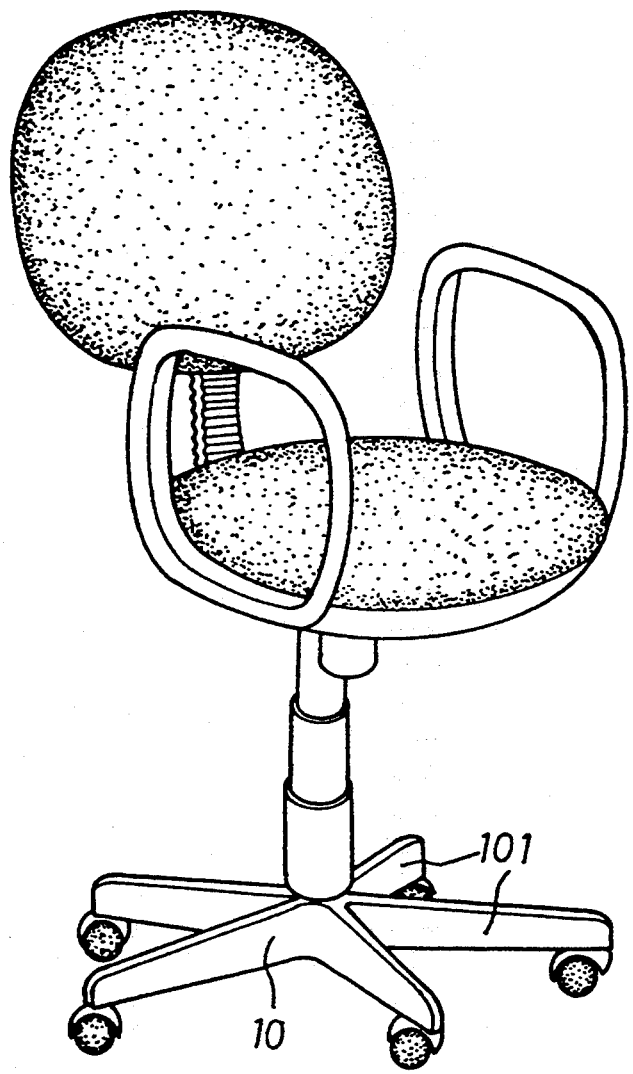
FIG. 1 is an elevational view of an office chair made according to the prior art.
Figure 2:
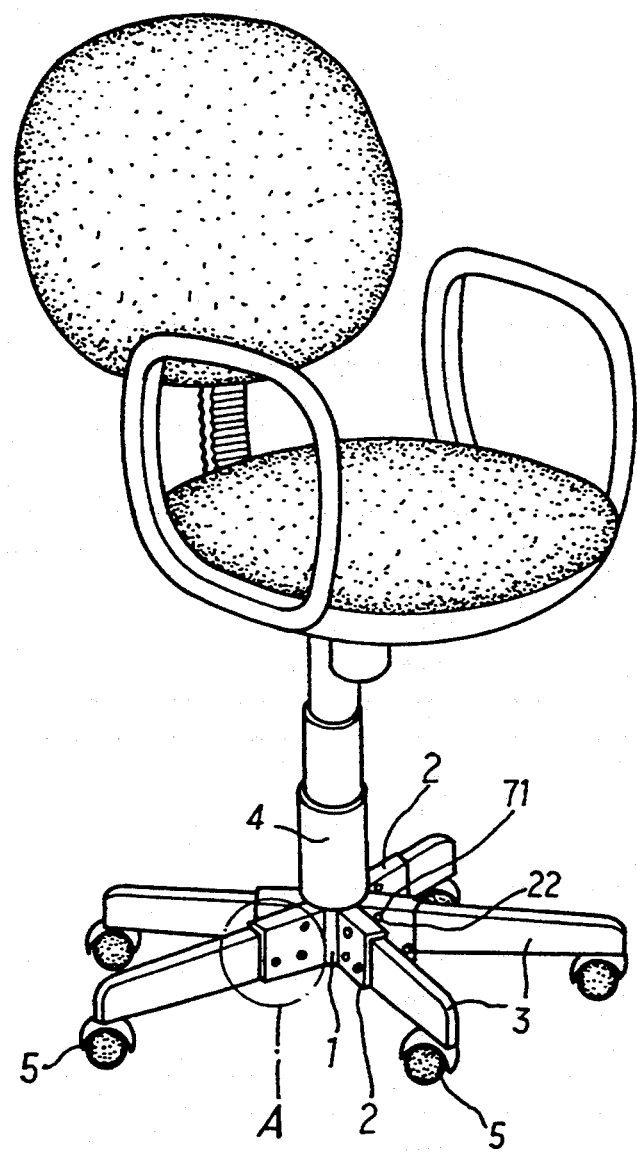
FIG. 2 is an elevational view of an office chair made according to the present invention.
Figure 5:
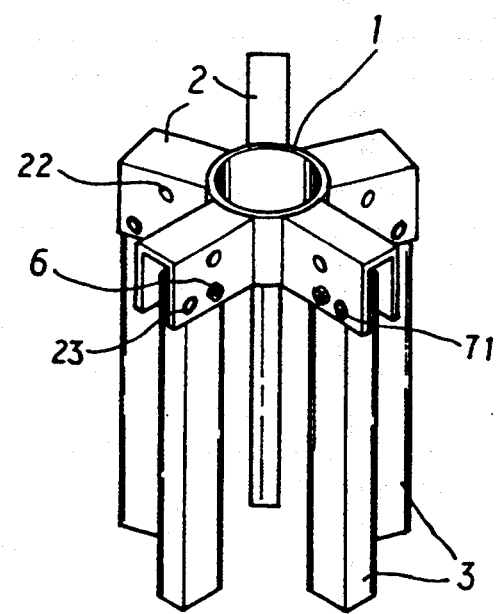
FIG. 5 shows the folding office chair stand of the preferred embodiment of the present invention collapsed.

Referring to FIGS. 2 and 5, a stand for a folding office chair in accordance with the preferred embodiment of the present invention, is generally comprised of an annular frame 1, which receives the upright shaft 4 of an office chair, a plurality of lugs 2 radially and horizontally extended from the annular frame 1, and a plurality of legs 3 respectively hinged to either lug 2. The leg 2 has an opposite end supported on a respective wheel assembly 5.

Figure 3:
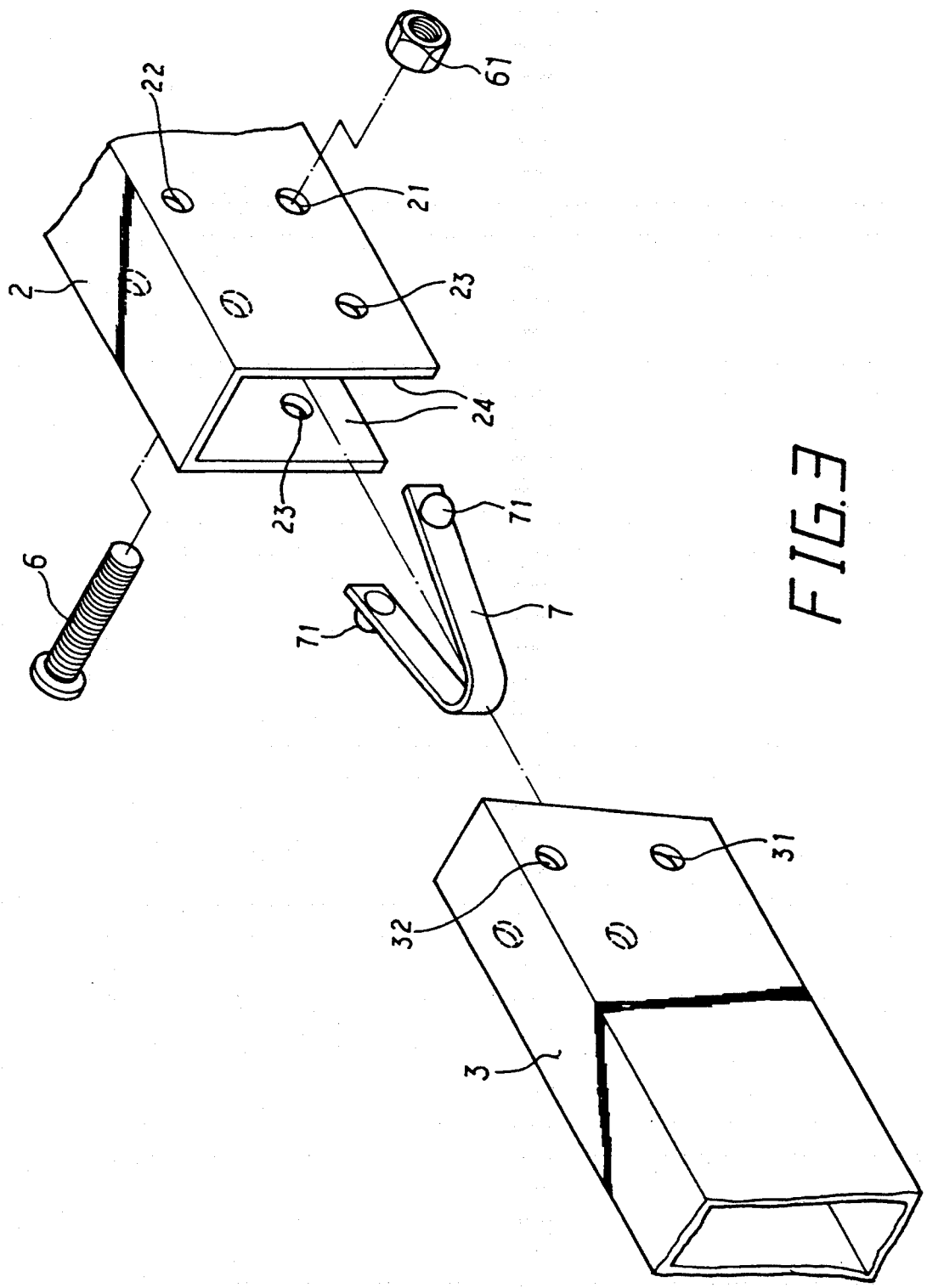
FIG. 3 is an exploded view taken on part A of FIG. 2.
Figure 4:
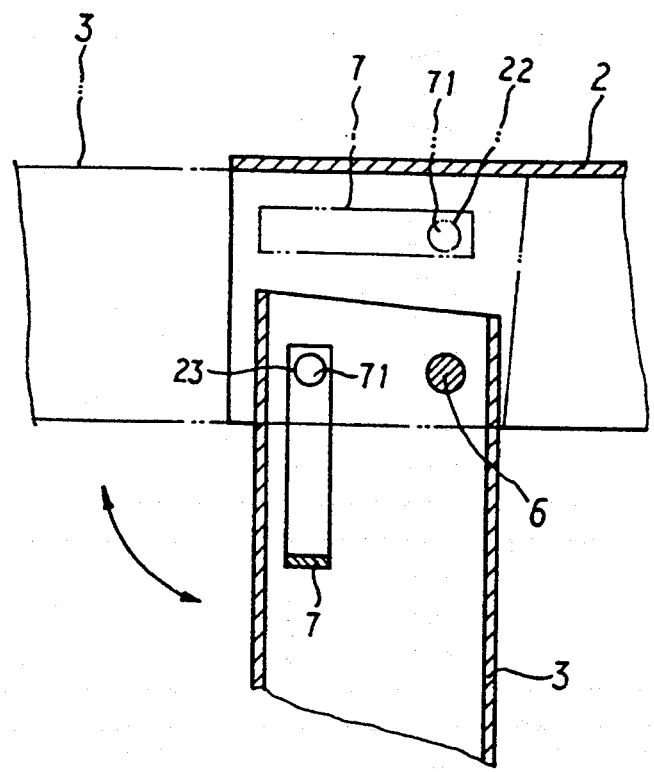
FIG. 4 is a sectional view taken on part A of FIG. 2 when folded up.

Referring to FIGS. 3 and 4, the lug 2 is shaped like a channel plate and horizontally connected to the annular frame 1 on the outside with the opening thereof facing downward, having a pair of bolt holes 21, a pair of first retaining holes 22, and a pair of second retaining holes 23 respectively made on two opposite vertical side walls of the lug. The leg 3 is made hollow, having a pair of bolt holes 31 and a pair of retaining holes 32 respectively made on two opposite side walls thereof at one end. By inserting the leg 3 into a lug 2 and connecting the bolt holes 31 thereof to the bolt holes 21 on the lug 2 by a screw bolt 6 and a nut 61, the leg 3 is hinged to the respective lug 2 and allowed to be turned between the working position in line with the respective lug 2 and the collapsed position perpendicular to the respective lug 2. The leg 3 has a retainer spring 7 fastened on the inside. The retainer spring 7 has two projecting rods 71 on two opposite ends thereof respectively extending out of either retaining hole 32 and stopped against the inside surface 24 of either vertical side wall of the respective lug 2. The projecting rod 71 has a circularly curved head so that it can be smoothly moved along the inside surface 24 of either vertical side wall of the respective lug 2.

Referring to FIGS. 2 and 4 again, when the leg 3 is turned to the working position in line with the respective lug 2, the projecting rods 71 of the retainer spring 7 are respectively engaged into the first retaining holes 22 on the respective lug 2, and therefore the leg is locked in the working position.

Referring to FIG. 5 and FIG. 4 again, by squeezing the projecting rods 71 inwards from the first retaining holes 22 on the respective lug 2 and then turning the leg 3 downward to the collapsed position, the projecting rods 71 become respectively engaged into the second retaining holes 23 on the respective lug 2, and therefore the leg 3 is locked in the collapsed position as shown in FIG. 5.

When either leg 3 or the wheel assembly on either leg 3 is damaged, the leg 3 can be dismantled from the respective lug 2 for a repair or replacement by unfastening the respective screw bolt 6 and nut 61.

What is claimed is:

1. A folding stand for an office chair, comprising: an annular frame, adapted to receive an upright shaft of an office chair; a plurality of lugs radially and horizontally extended from said annular frame; a plurality of retainer springs; and a plurality of legs hinged respectively to one of said lugs and alternatively locked to one of said lugs respectively by a respective one of said retainer springs between a working position where a respective one of said legs is in line with a respective one of said lugs or a collapsed position where a respective one of said legs is perpendicular to a respective one of said lugs, wherein said lugs are each shaped like a channel plate, with each of said lugs comprising a longitudinal bottom opening, a pair of bolt holes on two opposite vertical side walls of said lugs, a pair of first retaining holes and a pair of second retaining holes respectively defined on the two vertical side walls, wherein said legs are made of a hollow structure, each leg having a pair of opposite bolt holes at one end connected to the bolt holes on its respective lug on the inside of said respective lug by a screw bolt and a nut, a pair of opposite retaining holes alternatively connected to the pair of first retaining holes or second retaining holes on its respective lug by a respective retainer spring, and a wheel at an opposite end of a respective one of said legs for supporting the folding stand on a surface; said retainer spring being received inside a respective one of said leg, having two projecting rods on two opposite ends thereof respectively extending out of the pair of retaining holes on the respective leg and, alternatively engaged into the pair of first retaining holes on the respective lug to lock the respective leg in the working position, or the pair of second retaining holes on the respective lug to lock the respective leg in the collapsed position.

2. The folding stand for an office chair of claim 1, wherein each of said projecting rods of said retainer spring has a circularly curved head extended out of either of said retaining holes on the respective leg.

* * * * *